(12) United States Patent
Kumaresan Nair et al.

(10) Patent No.: US 10,977,707 B2
(45) Date of Patent: Apr. 13, 2021

(54) IDENTIFYING PRODUCT ITEMS BASED ON SURGE ACTIVITY

(71) Applicant: eBay Inc., San Jose, CA (US)

(72) Inventors: Satheesh Kumaresan Nair, Santa Clara, CA (US); Vikas Singh, San Jose, CA (US)

(73) Assignee: eBay Inc., San Jose, CA (US)

( * ) Notice: Subject to any disclaimer, the term of this patent is extended or adjusted under 35 U.S.C. 154(b) by 268 days.

(21) Appl. No.: 16/015,459

(22) Filed: Jun. 22, 2018

(65) Prior Publication Data

US 2019/0392501 A1    Dec. 26, 2019

(51) Int. Cl.
*G06Q 30/00* (2012.01)
*G06Q 30/06* (2012.01)
*G06N 20/00* (2019.01)

(52) U.S. Cl.
CPC ......... *G06Q 30/0625* (2013.01); *G06N 20/00* (2019.01)

(58) Field of Classification Search
CPC ............................ G06Q 30/0625; G06N 20/00
USPC ....................................................... 705/26, 27
See application file for complete search history.

(56) References Cited

U.S. PATENT DOCUMENTS

| | | | |
|---|---|---|---|
| 7,113,917 B2 | 9/2006 | Jacobi et al. | |
| 7,464,056 B1 | 12/2008 | Campbell et al. | |
| 7,493,274 B2 | 2/2009 | Bezos et al. | |
| 8,260,666 B2 | 9/2012 | Kalaboukis et al. | |
| 8,719,109 B1 | 5/2014 | Elicin et al. | |
| 2006/0277130 A1 | 12/2006 | Harmon | |
| 2011/0004509 A1 | 1/2011 | Wu et al. | |
| 2013/0204701 A1* | 8/2013 | Calafiore | G06Q 50/01 705/14.53 |
| 2014/0019285 A1* | 1/2014 | Karthik | G06Q 30/08 705/26.3 |
| 2014/0089044 A1 | 3/2014 | Nipko et al. | |
| 2015/0019568 A1 | 1/2015 | Pelsmaeker et al. | |
| 2016/0148289 A1 | 5/2016 | Altschuler | |
| 2016/0232625 A1* | 8/2016 | Akutagawa | H04L 65/403 |

FOREIGN PATENT DOCUMENTS

WO    2019/246345 A1    12/2019

OTHER PUBLICATIONS

"Terapeak's Listing Analytics App Upgraded With New Dashboard to Help Bay Sellers Increase Sales," Canada NewsWire [Ottawa] Jun. 4, 2015, Dialog #1685868897, 2pgs. (Year: 2015).*
International Search Report received for PCT Application No. PCT/US2019/038146, dated Aug. 6, 2019, 3 pages.
International Written Opinion received for PCT Application No. PCT/US2019/038146, dated Aug. 6, 2019, 7 pages.
International Preliminary Report on Patentability Received for Application No. PCT/US2019/038146, dated Dec. 30, 2020, 9 Pages.

* cited by examiner

*Primary Examiner* — Robert M Pond
(74) *Attorney, Agent, or Firm* — Schwegman Lundberg & Woessner, P.A.

(57) ABSTRACT

Various embodiments described herein assist in identifying one or more product items of interest (e.g., high demand product items) based on surge activity, such as user buying surges, user selling surges, and user product listing (e.g., electronic or online listing) surges on an online marketplace system, and can further notify one or more users of selling opportunities of the identified products items of interest.

20 Claims, 11 Drawing Sheets

FIG. 8

IDENTIFYING PRODUCT ITEMS BASED ON SURGE ACTIVITY

TECHNICAL FIELD

The present disclosure relates generally to electronic listings and, more particularly, identifying product items for electronic listing (e.g., on an online marketplace) based on surge activity relating to the item, such as online activities that indicate supply or demand surges.

BACKGROUND

Today, machine learning models are used by online marketplaces to provide buying recommendations of product items, typically using item-to-item affinities that are identified by correlating purchase histories of items bought together by different users. However, such buying affinity models are not useful for recommending selling opportunities of product items. Additionally, though the item purchase history of a user can provide information about product items that may be in user's possession, such purchase history cannot establish the user's intent for selling any of those product items. The challenges associated with identifying and recommending such selling opportunities in an online environment results in substantial system inefficiencies. A high demand product item possessed by a particular user of an online marketplace that could otherwise be listed for sale to meet user demand on the online marketplace may instead remain in the particular user's inventory; those users demanding the product item would have to either (constantly or periodically) check the online marketplace for when the product item is available or have a mechanism of the online marketplace inform them when the product item is available, each of which can cause inefficient usage of the online marketplace's digital resources.

Accordingly, it would be beneficial to have a system that could more readily identify and recommend such selling opportunities to users of the online marketplace to source product items for online listing for sale. Furthermore, the aligning of supply with demand can lead to a less cluttered network of online listings, which in turn can provide buying users a cleaner online marketplace environment in which to identify desired product items, and one that results in less searching and sifting through digital records, thereby reducing the usage of digital resources of the online marketplace.

BRIEF DESCRIPTION OF THE DRAWINGS

Various ones of the appended drawings merely illustrate example embodiments of the present disclosure and cannot be considered as limiting its scope.

FIG. 8 illustrates example notifications, in accordance with some embodiments.

Figure 1:
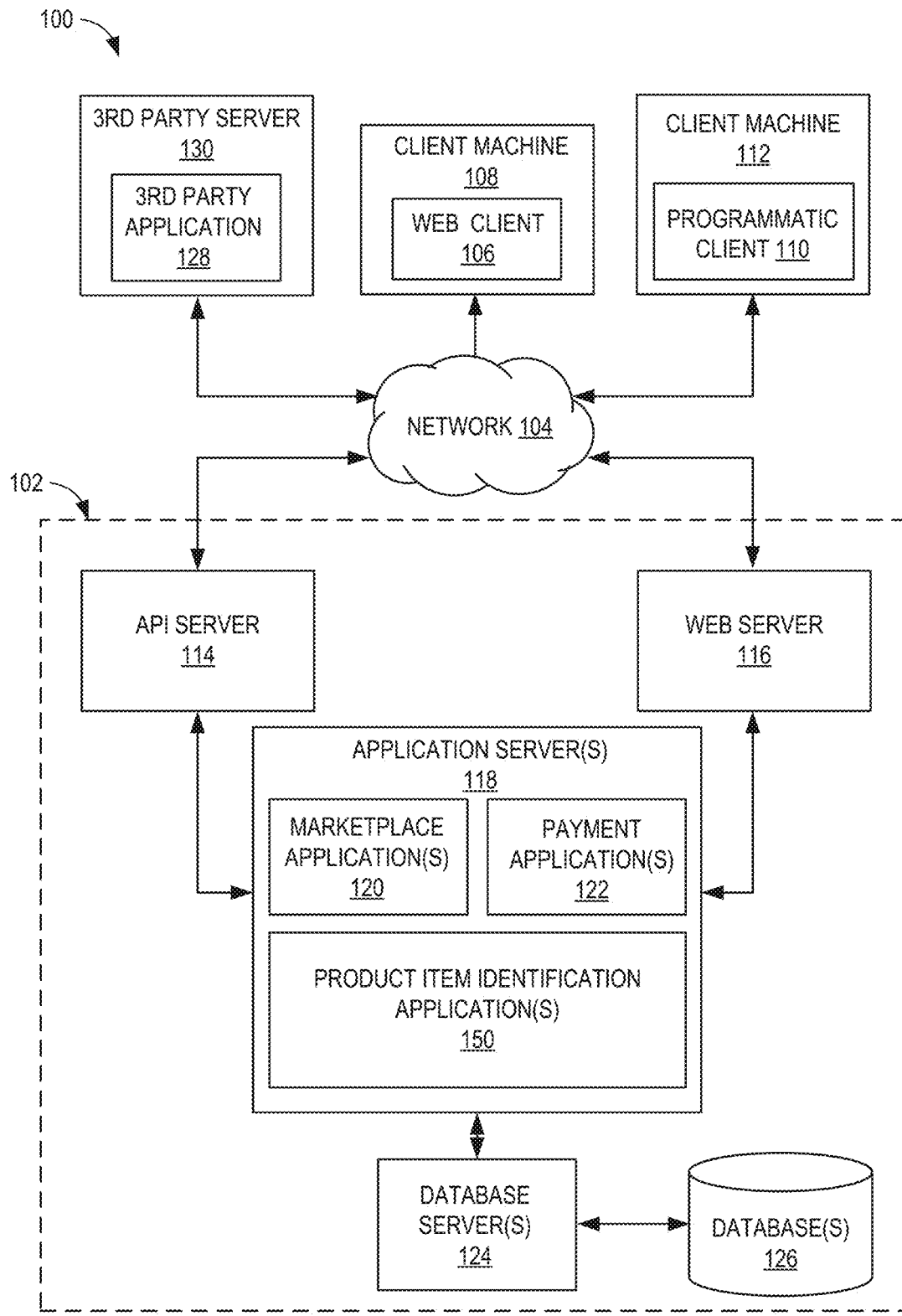
FIG. 1 is a network diagram depicting an example client-server system, within which an embodiment may be deployed.

The headings provided herein are merely for convenience and do not necessarily affect the scope or meaning of the terms used.

DETAILED DESCRIPTION

Various embodiments described herein assist in identifying one or more product items of interest (e.g., high demand product items) based on surge activity, such as user buying surges, user selling surges, and user product listing (e.g., electronic or online listing) surges on an online marketplace system (hereafter, online marketplace), and can further notify one or more users (e.g., of the online marketplace) of selling opportunities of the identified products items of interest. For example, some embodiments described herein analyze (e.g., applying machine learning methods) supply or demand surges for specific product items of interest (e.g., high-demand product items) based on real-time statistical data, select users based on one or more product item affinity patterns (e.g., a product listing affinity) that are determined in view of the specific product items of interest, and automatically notify user accounts of the selected users (e.g., in real-time) regarding selling opportunities for the specific product items of interest. As a result, some embodiments can apply machine learning to track and notify users of the online marketplace about selling opportunities.

A notification provided in some embodiments can include, without limitation, one delivered via an e-mail, a mobile notification, an item listing success page, an item search results page, or a checkout page of an online marketplace. For instance, while browsing a web page, an embodiment may use a notification embedded in the web page to surface to a user high demand product items from the user's inventory (e.g., based on the user's purchase history) at appropriate entry points to accept an opportunity to sell the product items, such as on a search web page, a product listing success web page, or a checkout success web page of an online marketplace. According to some embodiments, once a notification is sent (e.g., communicated over a network) to a client device, the user receiving the notification can initiate a process by which to list on an online marketplace one or more product items of interest (e.g., high demand product items) described (e.g., enumerated) in the notification. A notification may include a graphical user interface (GUI) element, such as a button (e.g., Hypertext Markup Language [HTML] defined button), to initiate a process for listing one or more product items of interest.

Additionally, various embodiments apply machine learning (e.g., deep learning) methods to perform user segmentation of such surges to the selected users to be notified about the selling opportunities of specific product items of interest. To analyze demand/supply surges, in some embodiments, a machine learning method is used to monitor (e.g., in real-time) for surges in listing-for-sale activity by one or more selling users on the online marketplace, and to monitor (e.g., in real-time) browsing activity of one or more buying users on the online marketplace, or both.

Some embodiments can improve or enable a computer system to notify one or more users of an online marketplace when one or more product items in their past-purchase inventory have high demand on the online marketplace, or in making one or more users of the online marketplace aware when one or more other users of the online marketplace are earning money by selling those one or more product items through the online marketplace. Additionally, use of various embodiments can improve or enable a computer system's ability to facilitate quicker and more efficient movement of certain product items (e.g., high demand product items) on an online marketplace. In this way, various embodiments provide computer systems that provide user with a cleaner online marketplace environment in which to identify desired product items and can provide users a cleaner online marketplace environment that results in less searching and sifting through digital records, thereby reducing the usage of digital resources of the online marketplace. The notification of an embodiment may not only remind a buying or selling user of the current worth or demand of one or more product items in their inventory, but also permit an online marketplace to source high demand product items from their own user base to replenish product inventory gap.

Though various embodiments are described herein with respect to a product item of interest comprising a product item in high demand, for some embodiments, the product item of interest may comprise a product that is not necessarily in high demand (e.g., the product item is one that is hard to find or rarely listed on the online marketplace).

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a network diagram depicting an example client-server system 100, within which an embodiment may be deployed. A networked system 102, in the example forms of a network-based marketplace or publication system, provides server-side functionality, via a network 104 (e.g., the Internet or a Wide Area Network (WAN)) to one or more clients. FIG. 1 illustrates, for example, a web client 106 (e.g., a web browser) and a programmatic client 110 executing on respective client machines 108 and 112.

An application programming interface (API) server 114 and a web server 116 are coupled to, and provide programmatic and web interfaces respectively to, one or more application servers 118. The application servers 118 host one or more marketplace applications 120, payment applications 122, and product item identification applications 150. The application servers 118 are, in turn, shown to be coupled to one or more database servers 124 that facilitate access to one or more databases 126.

The marketplace applications 120 may provide a number of online marketplace functions and services to users who access the networked system 102, such as searching for items for purchase, posting items for purchase, and facilitating purchase of items (e.g., between two users or between a user and the marketplace provider). The payment applications 122 may provide a number of payment services and functions to users. The payment applications 122 may allow users to accumulate value (e.g., in a commercial currency, such as the U.S. dollar, or a proprietary currency, such as "points") in accounts, and then later to redeem the accumulated value for product items (e.g., goods or services) that are made available via the marketplace applications 120.

In accordance with various embodiments described herein, the product item identification applications 150 provide functions or services relating to identifying one or more product items of interest, such as a high demand product item, based on surge activity on an online marketplace system (e.g., one implemented using or supported by the marketplace applications 120), and relating to notifying relevant user accounts of selling opportunities of the product items of interest. For instance, the product item identification applications 150 may monitor for surge activity, such as a surge in listings (for sale) of a particular product item on an online marketplace, or a surge in demand for the particular product item on the online marketplace. The surge activity may be reflected by, for example, a surge in electronic transactions (e.g., sales) of the particular product item through the online marketplace, user browsing or search activity on the online marketplace for the particular product item, or an explicit expression of interest by a user (e.g., a request by the user to be informed when an out-of-stock product item is available again on the online marketplace). Depending on the embodiment, the product item identification applications 150 may use one or more machine learning methods to identify such surge activity. Surge activity (e.g., listing or selling) with respect to a particular product item may be due to a number of reasons including, for example, a non-existing need of the particular product item, dissatisfaction with the particular product item, release of newer versions of the particular product item, release of better alternatives to the particular product item, or awareness about high earning potential of selling the particular product item.

The product item identification applications 150 may analyze product listing affinity patterns, based on one or more (primary) user accounts on an online marketplace associated with users identified as either having bought or sold a product item of interest (e.g., a high demand product item) on the online marketplace, to identify secondary user accounts on the online marketplace associated with users that have a likelihood (e.g., high likelihood) of also possessing the same product item of interest and that can be notified about selling opportunities for the product item of interest. In this way, the product item identification applications 150 can notify not just the one or more primary user accounts regarding the opportunity to sell the product item of interest, but also notify one or more of the secondary user accounts of the same selling opportunity. Additionally, the product item identification applications 150 can further identify (e.g., target) a specific set of secondary user accounts for notification based on, for instance, demographics (e.g., gender, age, nationality, ethnicity, education, job occupation, income level, etc.), geographic location, psychographic attributes, and the like. More details regarding use of product listing affinity patterns and identification of user account segmentation by different embodiments is provided below with respect to, for example, FIGS. 5, 6, 7A, and 7B.

According to various embodiments, one or more functions of the product item identification applications 150, such as identifying product items of interest, identifying relevant user accounts on the online marketplace in view of the product items of interest (e.g., primary and secondary user accounts), and notifying the relevant user accounts, may involve the product item identification applications 150 interfacing/interacting with the marketplace applications 120.

While the marketplace, payment, and product item identification applications 120, 122, and 150 are shown in FIG. 1 to form part of the networked system 102, it will be appreciated that, in some embodiments, any of the applications may form part of a service that is separate and distinct from the networked system 102. For example, for some embodiments, the payment applications 122 may form part of a payment service that is separate and distinct from the networked system 102.

Further, while the system 100 shown in FIG. 1 employs a client-server architecture, the embodiments are, of course, not limited to such an architecture, and could equally well find application in a distributed, or peer-to-peer, architecture system, for example. The various marketplace, payment, and product item identification applications 120, 122, and 150 could also be implemented as standalone software programs, which do not necessarily have networking capabilities. Further, one or more of the product item identification applications 120, 122, and 150 can be implemented as part of the marketplace applications 120.

The web client 106 accesses the various marketplace, payment, and product item identification applications 120, 122, and 150 via the web interface supported by the web server 116. Similarly, the programmatic client 110 accesses the various services and functions provided by the various marketplace, payment, and product item identification applications 120, 122, and 150 via the programmatic interface provided by the API server 114. The programmatic client 110 may, for example, be a seller application to enable sellers (e.g., seller users) to author and manage listings on the networked system 102 in an offline manner, and to perform batch-mode communications between the programmatic client 110 and the networked system 102.

FIG. 1 also illustrates a third-party application 128 executing on a third-party server machine 130 as having programmatic access to the networked system 102 via the programmatic interface provided by the API server 114. For example, the third-party application 128 may, utilizing information retrieved from the networked system 102, support one or more features or functions on a website hosted by a third party. The third-party website may, for example, provide one or more promotional, marketplace, payment, multi-directional electronic transaction functions that are supported by the relevant applications of the networked system 102.

Figure 2:
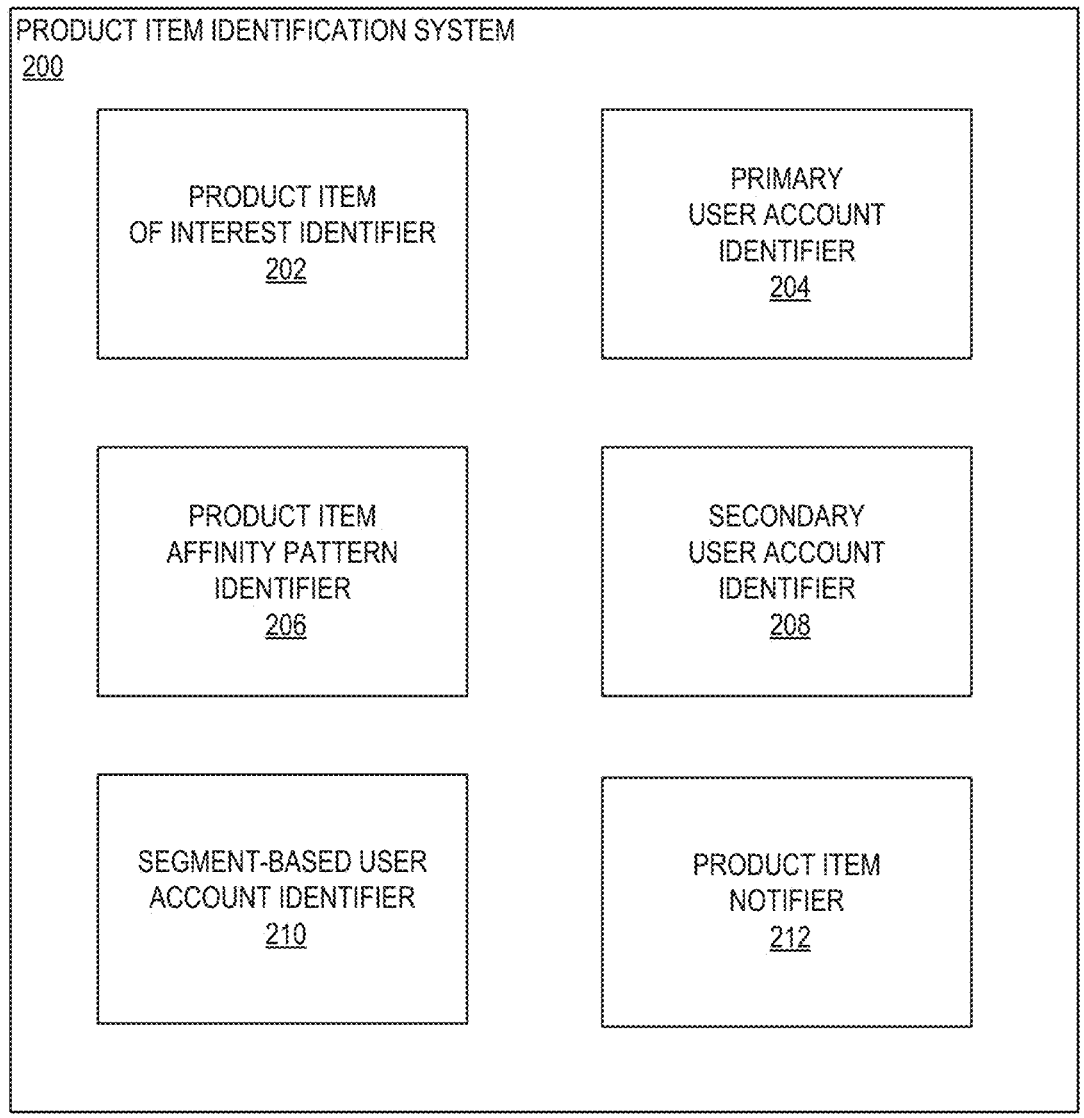
FIG. 2 is a block diagram illustrating an example product item identification system, in accordance with some embodiments.

FIG. 2 is a block diagram illustrating an example product item identification system 200, in accordance with some embodiments. For various embodiments, the components and arrangement of components may vary from what is illustrated in FIG. 2. For instance, the product item identification system 200 can include more or fewer components than the components shown in the FIG. 2. The various modules of the product item identification system 200 may be configured to communicate with each other (e.g., via a bus, shared memory, or a switch). Any modules may be implemented using one or more processors (e.g., by configuring such one or more computer processors to perform functions described for that module) and hence may include one or more of the processors 1010. As shown in FIG. 2, the product item identification system 200 comprises a product item of interest identifier 202, a primary user account identifier 204, a product item affinity pattern identifier 206, a secondary user account identifier 208, a segment-based user account identifier 210, and a product item notifier 212.

The product item of interest identifier 202 determines (e.g., identifies) one or more product items of interest (e.g., high demand product item) based on surge activity on an online marketplace system. In particular, the product item of interest identifier 202 can identify, from a product item database (e.g., of an online marketplace system), a first product item record for a first product item of interest that is in high demand on an online marketplace system. The product item of interest identifier 202 may monitor for surge activity, such as a surge in listings (for sale) of a particular product item on an online marketplace, or a surge in demand for the particular product item on the online marketplace. The surge activity may be reflected by, for example, a surge in electronic transactions (e.g., sales) of the particular product item through the online marketplace, user browsing or search activity on the online marketplace for the particular product item, or an explicit expression of interest by a user (e.g., a request by the user to be informed when an out-of-stock product item is available again on the online marketplace). As noted herein, surge activity (e.g., listing or selling) with respect to a particular product item may be due to a number of reasons including, for example, a non-existing need of the particular product item, dissatisfaction with the particular product item, future demand predictions for the particular product item, release of newer versions of the particular product item, release of better alternatives to the particular product item, or awareness about high earning potential of selling the particular product item. The product item of interest identifier 202 may use one or more machine learning methods to identify such surge activity.

The primary user account identifier 204 determines, from a user database (e.g., of the online marketplace system), a first set of user accounts associated with obtaining (e.g., purchasing) the first product item of interest (e.g., identified by the product item of interest identifier 202) through an online marketplace system, and determines, from the user database, a second set of user accounts associated with listing the first product item of interest for sale on the online marketplace system. Within the context of this description, both the first set of user accounts and the second set of user accounts can represent (at least a portion of) the primary user accounts being targeted for notification regarding a selling opportunity of the first product item of interest (e.g., which may be in high demand) on an online marketplace system. Additionally, the primary user account identifier 204 can determine a subset of user accounts of the second set of user accounts, where user accounts in the subset are not associated with a current listing of the first product item of interest for sale on the online marketplace system (e.g., the users accounts in the subset listed the first product item of interest for sale in the past).

The product item affinity pattern identifier 206 determines at least one product item affinity pattern between the first set of user accounts and the second set of user accounts determined, both of which may be determined by the primary user account identifier 204. According to some embodiments, the product item affinity pattern identifier 206 determines the at least one product item affinity pattern based on a first set of product items bought by the first set of user accounts through the online marketplace system and a second set of product items listed by the second set of user accounts on the online marketplace system. For some embodiments, the product item affinity pattern identifier 206 determines the product item affinity pattern by: determining, from the product item database (e.g., of the online marketplace system), a first set of product item records for the first set of product items bought by the first set of user accounts through the online marketplace system; determining, from the product item database, a second set of product item records for the second set of product items listed by the second set of user accounts on the online marketplace system; and determining a third set of product items common to both the first set of product items and the second set of product items. Both the first set of product items and the second set of product items may exclude the first product of interest (e.g., the high demand product item) determined by the product item of interest identifier 202. Subsequently, the product item of interest identifier 202 determines a second product item of interest from the third set of product items, which may be based on ranking product items (e.g., confidence scores) within the third set of product items. For instance, the product item of interest identifier 202 may determine a first ranking for the first set of product items, determine a second ranking for the second set of product items, and then a second product item of interest is determined from the third set of product items based on the first ranking and the second ranking. The determined second product item of interest may be, for example, a particular product item, in the third set of product items, having the highest ranking based on the first ranking and the second ranking.

The secondary user account identifier 208 determines a third set of user accounts based on the first set of user accounts determined by the primary user account identifier 204, the second set of user accounts determined by the primary user account identifier 204, and the at least one product item affinity pattern determined by the product item affinity pattern identifier 206.

The segment-based user account identifier 210 determines a third set of user accounts based on the first set of user accounts determined by the primary user account identifier 204, the second set of user accounts determined by the primary user account identifier 204, and the at least one product item affinity pattern determined by the product item affinity pattern identifier 206.

The product item notifier 212 causes a notification to be sent (e.g., communicated over the network 104) to one or more client devices (e.g., 106, 112) associated with the third set of user accounts, where the notification informs the third set of user accounts of an opportunity to list the first product item of interest for sale on the online marketplace system. Within the context of this description, the third set of user accounts can represent secondary user accounts being targeted for notification regarding a selling opportunity of the first product item of interest (e.g., which may be in high demand) on an online marketplace system. Additionally, for some embodiments, the product item notifier 212 causes a notification (e.g., the same notification or similar notification as the third set of user accounts) to be sent to the first set of user accounts that is associated with obtaining (e.g., purchasing) the first product item of interest through the online marketplace system. Furthermore, for some embodiments, the product item notifier 212 causes a notification (e.g., the same notification or similar notification as the third set of user accounts) to be sent to the subset of user accounts of the second set of user accounts that may be determined by the primary user account identifier 204 (where the user accounts in the subset are associated with a current listing of the first product item of interest for sale on the online marketplace system).

Figure 3:
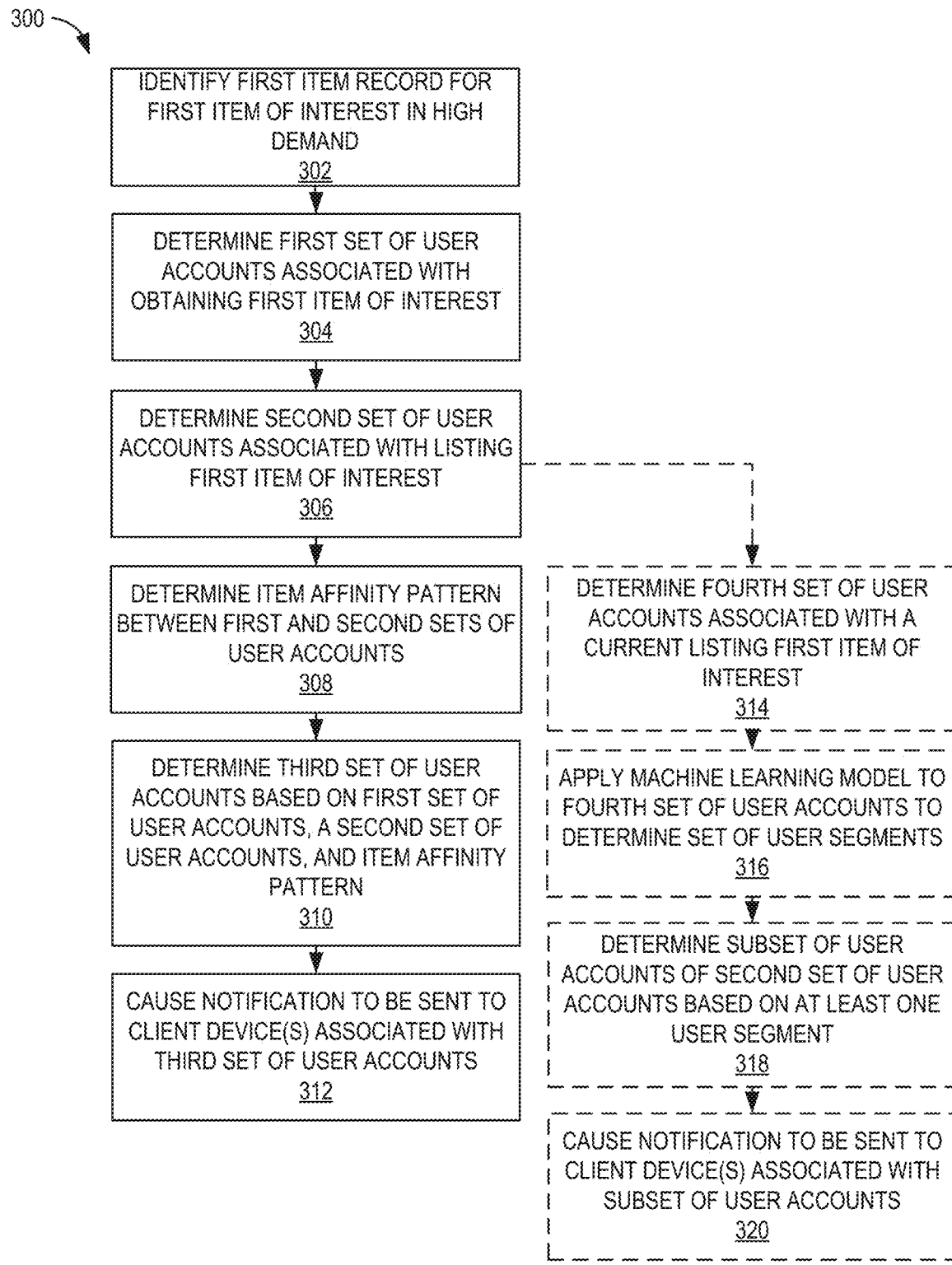
FIG. 3 is a flow diagram illustrating an example method for identifying product items based on surge activity, in accordance with some embodiments.

FIG. 3 is a flow diagram illustrating an example method 300 for identifying product items based on surge activity, in accordance with some embodiments. It will be understood that example methods described herein may be performed by a machine, in accordance with some embodiments. For example, the method 300 may be performed by the product item identification system 200. An operation of various methods described herein may be performed by a processor (e.g., a central processing unit or graphics processing unit) of a machine (e.g., a desktop, server, laptop, mobile phone, tablet, or other computing device), which may be part of a computing system based on a cloud architecture. Example methods described herein may also be implemented in the form of executable instructions stored on a machine-readable medium or in the form of electronic circuitry. For instance, the operations of a method 300 of FIG. 3 may be represented by executable instructions that, when executed by a processor of a machine, cause the machine to perform the method 300. Depending on the embodiment, an operation of an example method described herein may be repeated in different ways or involve intervening operations not shown. Although the operations of example methods may be depicted and described in a certain order, the order in which the operations are performed may vary among embodiments, including performing certain operations in parallel.

Referring now to the FIG. 3, as shown, the method 300 begins at operation 302 (e.g., by the product item of interest identifier 202) with identifying, from a product item database (e.g., of an online marketplace system), a first product item record for a first product item of interest that is in high demand on an online marketplace system. As noted herein, the first product item of interest may be identified as being in high-demand based on a surge in sales of the first product item product through the online marketplace system. Additionally, the first product item of interest may be identified as being in high-demand based on a surge in listing (e.g., electronic listing) of the first product item for sale on the online marketplace system. The one or more surges may be identified by a machine learning model.

The method 300 continues at operation 304 (e.g., by the primary user account identifier 204) with determining, from a user database (e.g., of the online marketplace system), a first set of user accounts associated with obtaining (e.g., purchasing) the first product item of interest through the online marketplace system. Within the context of this description, the first set of user accounts can represent (at least a portion of) the primary user accounts being targeted for notification regarding a selling opportunity of the first product item of interest (e.g., which may be in high demand) on an online marketplace system.

The method 300 continues at operation 306 with determining (e.g., by the primary user account identifier 204), from the user database (e.g., of the online marketplace system), a second set of user accounts associated with listing the first product item of interest for sale on the online marketplace system. Within the context of this description, the second set of user accounts can represent at least a portion of the primary user accounts being targeted for notification regarding a selling opportunity of the first product item of interest (e.g., which may be in high demand) on an online marketplace system. Optionally, operation 306 can determine (e.g., by the primary user account identifier 204) a subset of user accounts of the second set of user accounts, where user accounts in the subset are not associated with a current listing of the first product item of interest for sale on the online marketplace system (e.g., the users accounts in the subset listed the first product item of interest for sale in the past).

The method 300 continues at operation 308 (e.g., by the product item affinity pattern identifier 206) with determining at least one product item affinity pattern between the first set of user accounts determined by operation 304 and the second set of user accounts determined by operation 306. According to some embodiments, the at least one product item affinity pattern is determined based on a first set of product items bought by the first set of user accounts through the online marketplace system and a second set of product items listed by the second set of user accounts on the online marketplace system. For some embodiments, determining the product item affinity pattern may comprise: determining, from the product item database (e.g., of the online marketplace system), a first set of product item records for the first set of product items bought by the first set of user accounts through the online marketplace system; determining, from the product item database, a second set of product item records for the second set of product items listed by the second set of user accounts on the online marketplace system; and determining a third set of product items common to both the first set of product items and the second set of product items. Both the first set of product items and the second set of product items may exclude the first product of interest (e.g., the high demand product item) determined by operation 302. Subsequently, a second product item of interest is determined from the third set of product items, which may be based on ranking product items within the third set of product items. For instance, an embodiment may determine a first ranking for the first set of product items, determine a second ranking for the second set of product items, and then a second product item of interest is determined from the third set of product items based on the first ranking and the second ranking. The determined second product item of interest may be, for example, a particular product item, in the third set of product items, having the highest ranking based on the first ranking and the second ranking.

The method 300 continues at operation 310 (e.g., by the secondary user account identifier 208) with determining a third set of user accounts based on the first set of user accounts determined by operation 304, the second set of user accounts determined by operation 306, and the at least one product item affinity pattern determined by operation 308.

The method 300 continues at operation 312 (e.g., by the product item notifier 212) with causing a notification to be sent (e.g., communicated over the network 104) to one or more client devices (e.g., 106, 112) associated with the third set of user accounts, where the notification informs the third set of user accounts of an opportunity to list the first product item of interest for sale on the online marketplace system. Within the context of this description, the third set of user accounts can represent a secondary user accounts being targeted for notification regarding a selling opportunity of the first product item of interest (e.g., which may be in high demand) on an online marketplace system. Additionally, for some embodiments, operation 312 causes a notification (e.g., the same notification or similar notification as the third set of user accounts) to be sent to the first set of user accounts that is associated with obtaining (e.g., purchasing) the first product item of interest through the online marketplace system. Furthermore, for some embodiments, operation 312 causes a notification (e.g., the same notification or similar notification as the third set of user accounts) to be sent to the subset of user accounts of the second set of user accounts that may be determined by operation 306 (where the user accounts in the subset are associated with a current listing of the first product item of interest for sale on the online marketplace system).

As shown, from operation 306, the method 300 can optionally proceed to operations 314 through 320, one or more of which may be performed in parallel or subsequent to one or more of operations 308 through 312. At operation 314, (e.g., by the primary user account identifier 204) a fourth set of user accounts associated with a current listing of the first product item of interest for sale on the online marketplace system is determined. The method 300 continues at operation 316 with applying (e.g., by the segment-based user account identifier 210) a machine learning model to the fourth set of user accounts to determine a set of user segments each associated with a different set of factors, where the different set of factors can include at least one of a demographic attribute, a geographic location, or a psychographic attribute. The method 300 continues at operation 318 with determining (e.g., by the secondary user account identifier), from the user database (e.g., of the online marketplace system), a subset of user accounts of the second set of user accounts based on at least one user segment from the set of user segments. The method 300 continues with operation 320 (e.g., by the product item notifier 212) causing a notification to be sent to one or more client devices associated with the subset of user accounts determined by operation 318, where the notification informs the subset of user accounts of an opportunity to list the first product item of interest for sale on the online marketplace system.

Figure 4:
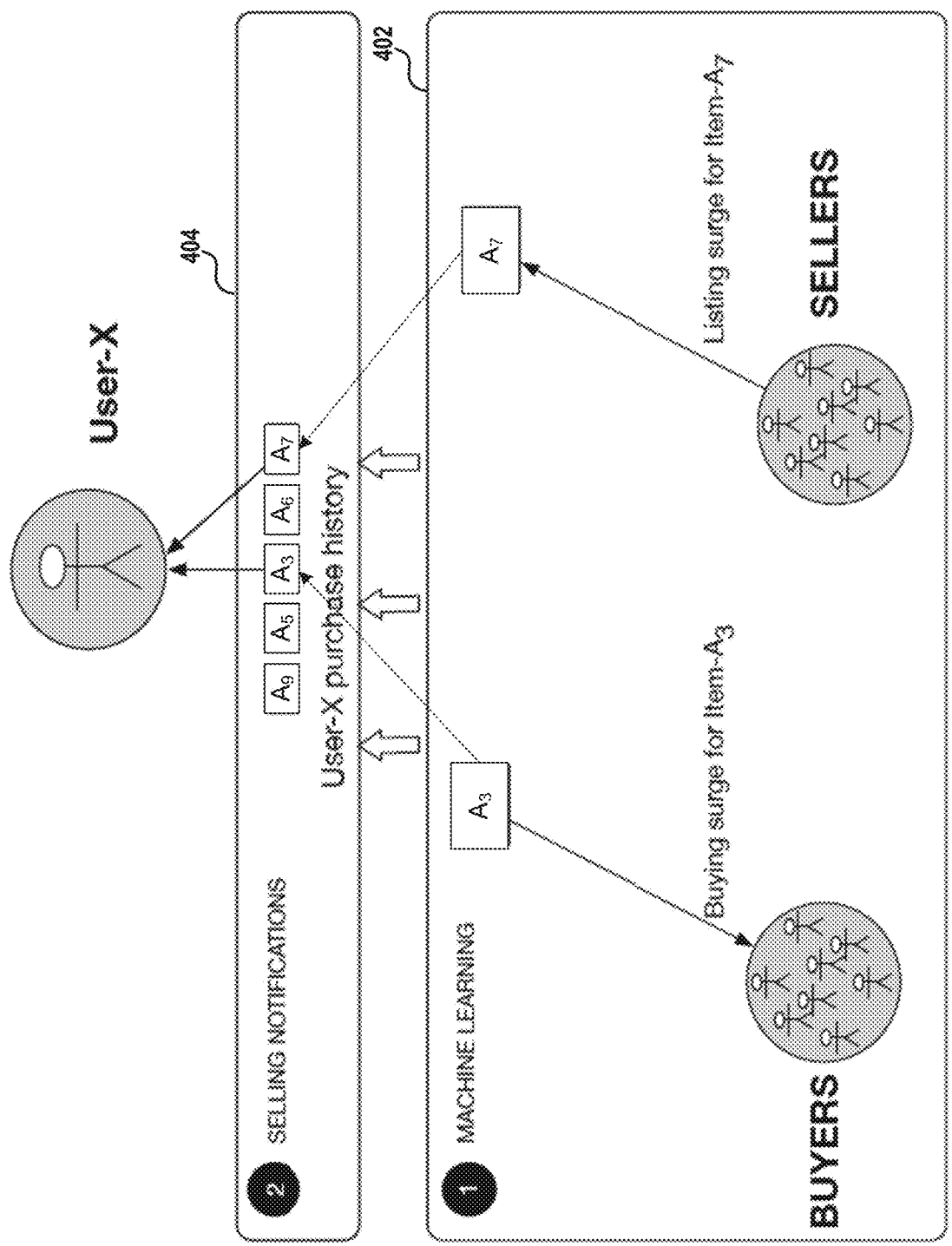
FIG. 4 is a diagram illustrating an example of identifying one or more product items of interest based on surge activity and notifying a user, in accordance with some embodiments.

FIG. 4 is a diagram illustrating an example of identifying one or more product items of interest based on surge activity and notifying a user, in accordance with some embodiments. As shown, at 402 a machine learning model detects a buying surge of product item $A_3$ (user accounts that are buyers on the online marketplace) and a listing surge of product item $A_7$ (user accounts that are sellers on the online marketplace) based on detecting the surges with respect to product items $A_3$ and $A_7$. At 404, user-x is sent a notification informing user-x of selling opportunities for one or more product items in their purchase history, which includes product items $A_3$ and $A_7$. As described herein, one or more of the product items $A_3$ and $A_7$ may be considered a high demand (either current demand or anticipated demand in future) product item on an online marketplace.

Figure 5:
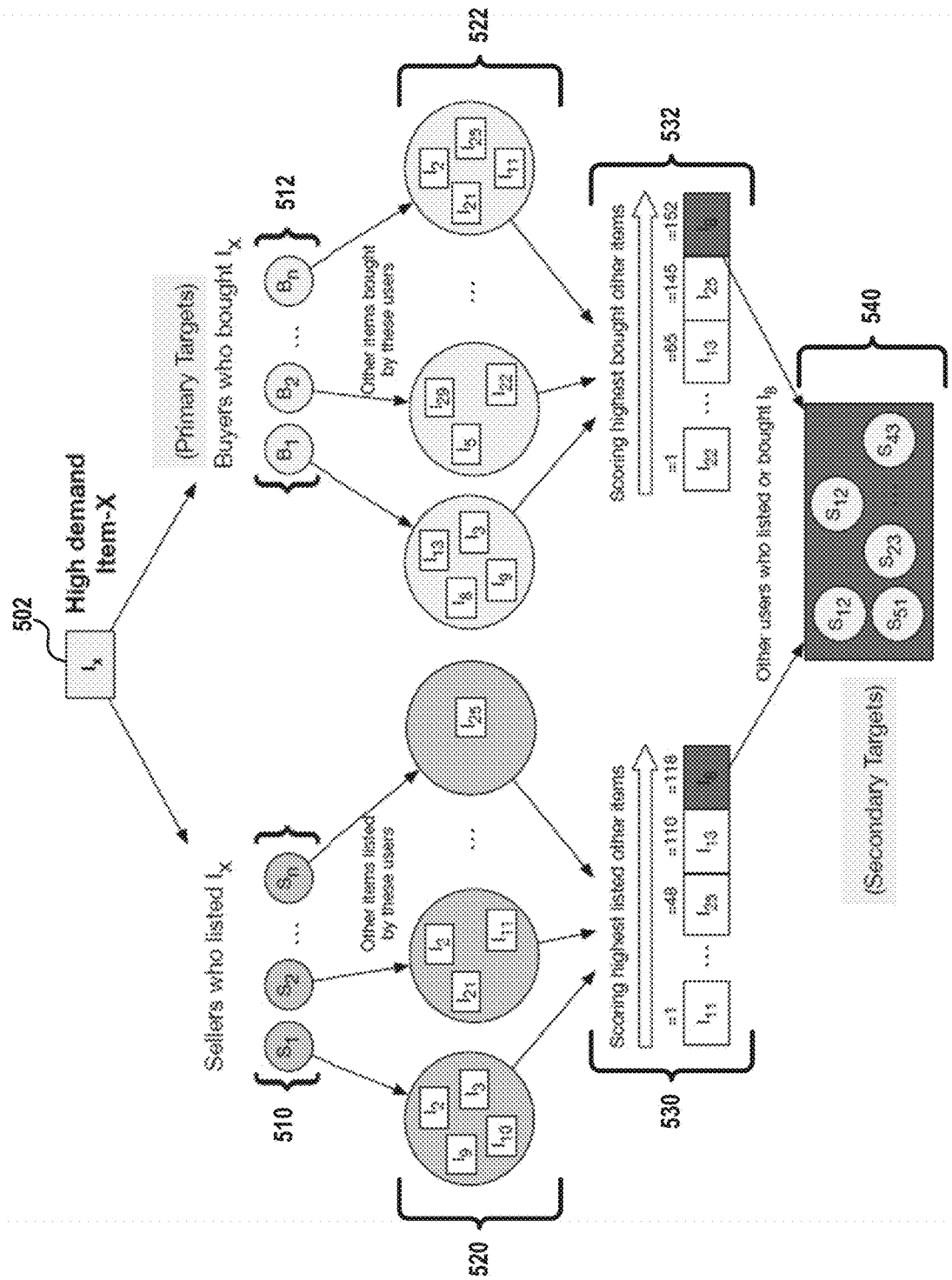
FIG. 5 is a diagram illustrating an example of identifying one or more secondary users to target for selling opportunities for a product item of interest, in accordance with some embodiments.

FIG. 5 is a diagram illustrating an example of identifying one or more secondary users to target for selling opportunities for a product item of interest, in accordance with some embodiments. In particular, FIG. 5 illustrates how some embodiments analyze product item listing and buying activity (of primary user accounts) and use affinity patterns to identify user accounts (secondary user accounts) to target for selling opportunities of a product item of interest. As shown, based on identification of a high demand product item Ix (502) on an online marketplace, a set of user accounts 510 that are sellers of (e.g., who currently listed or previously listed) high demand product item Ix on the online marketplace, and a set of user accounts 512 that are buyers of (e.g., who listed) high demand product item Ix from the online marketplace, are determined. Then, one or more other product items 520 listed (e.g., currently or in the past) by the seller user accounts 510 on the online marketplace are identified, and one or more other product items 522 bought by the buyer user accounts 512 are identified. Subsequently, the other products items 520 are scored and ranked to produce a ranked set of other product items 530, and the other product items 522 are scored and ranked to produce a ranked set of other product items 532. Then, the highest ranked other product item (e.g., $I_8$) common to both the ranked set of other product items 530 and the ranked set of other product items 532 is identified, and other user accounts 540 who either listed or bought the identified highest ranked other product (e.g., $I_8$) is identified. For some embodiments, the buyer user accounts represent primary targets for notifications for selling opportunities for the high demand product item Ix (502), while the other user accounts 540 represent secondary targets for notifications for selling opportunities for the high demand product item Ix (502). Additionally, for some embodiments, the other user accounts 540 represent the user accounts of users that have a likelihood (e.g., high likelihood) of possessing the high demand product item Ix (502). For instance, unlike the buyer user accounts 512 associated with users who obtained the high demand product item Ix (502) through the online marketplace (and thus listed in their online marketplace purchase history), the other user accounts 540 may have obtained the high demand product item Ix (502) from another source external to the online marketplace and, as such, the high demand product item Ix (502) may be a product item possessed by the users of the other user accounts 540 but not listed in the purchase history of those other user accounts 540.

Figure 6:
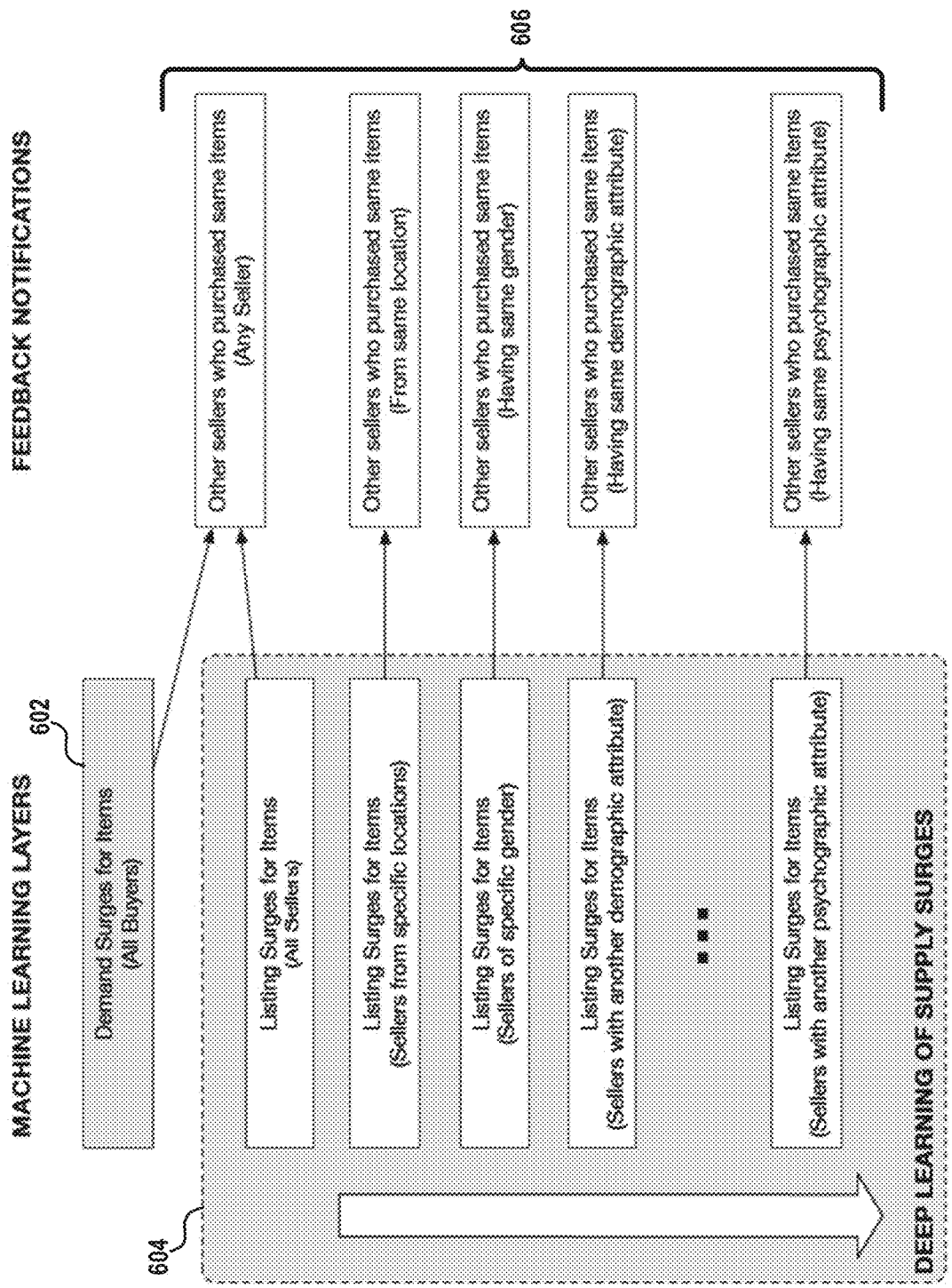
FIG. 6 is a diagram illustrating an example of segmenting user accounts to identify one or more relevant user accounts, in accordance with some embodiments.

FIG. 6 is a diagram illustrating an example of segmenting user accounts to identify one or more relevant user accounts, in accordance with some embodiments. As shown, demand surges for product items of interest associated with buyer user accounts is determined at 602 using a machine learning layer, and supply surges for the same product items of interest associated with seller user accounts are determined at 604 using deep machine learning layers. In particular, at 604, machine learning layers (e.g., deep machine learning layers) are used to selectively expose selling opportunities to a very targeted set of other user accounts 606 (e.g., seller user accounts) based on different factors, such as demographic attributes, geographic location, and psychographic attributes. The other user accounts 606 may then be notified about selling opportunities for the same product items of interest accordingly. In this way, an embodiment can notify user accounts regarding product item selling opportunities based on user segments (e.g., demographic segments).

Figure 7A:
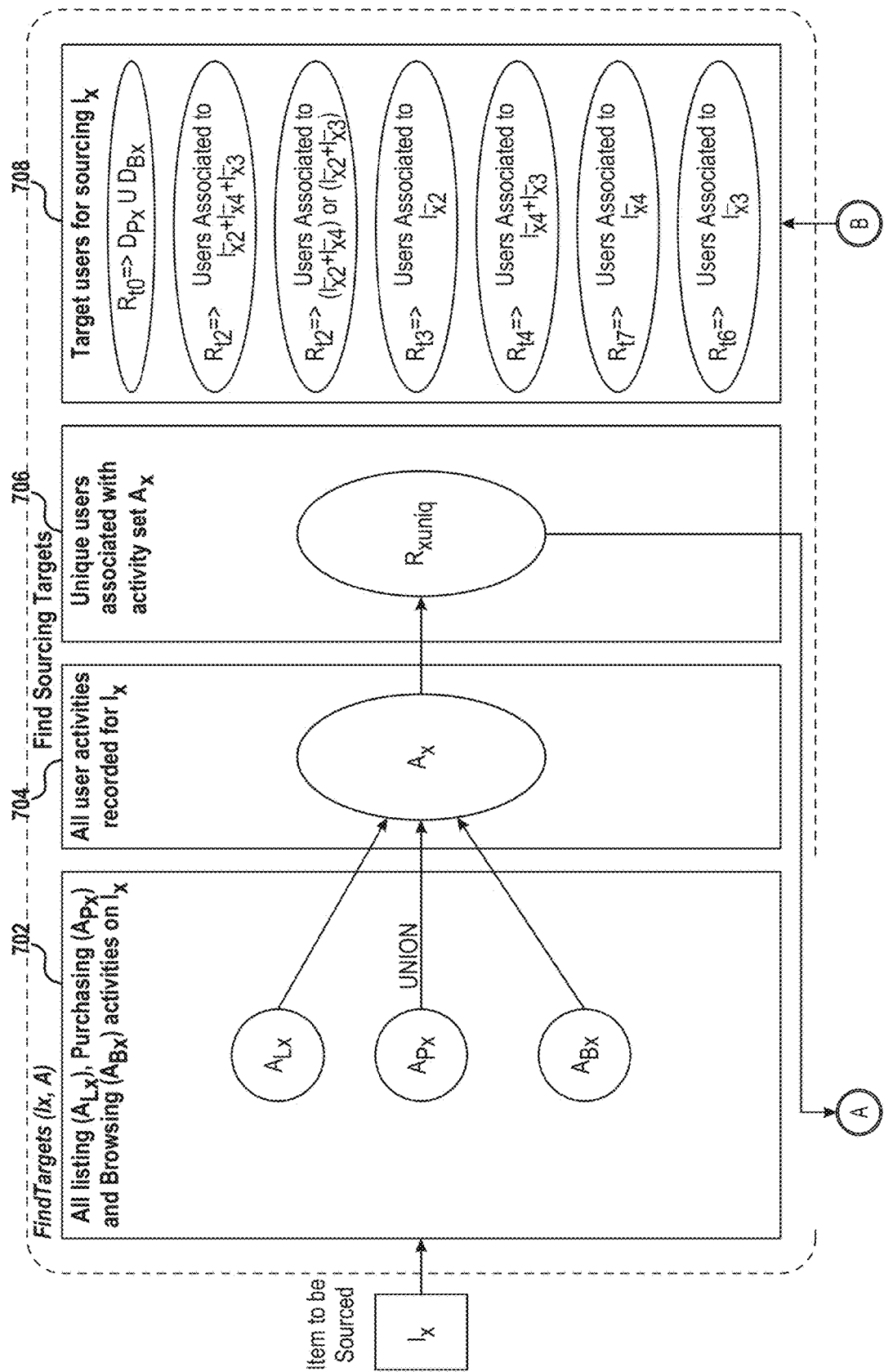
FIGS. 7A and 7B provide a diagram illustrating an example of an unsupervised machine-learning method for identifying user accounts that possess (or likely possess) one or more product items of interest, in accordance with some embodiments.
Figure 7B:
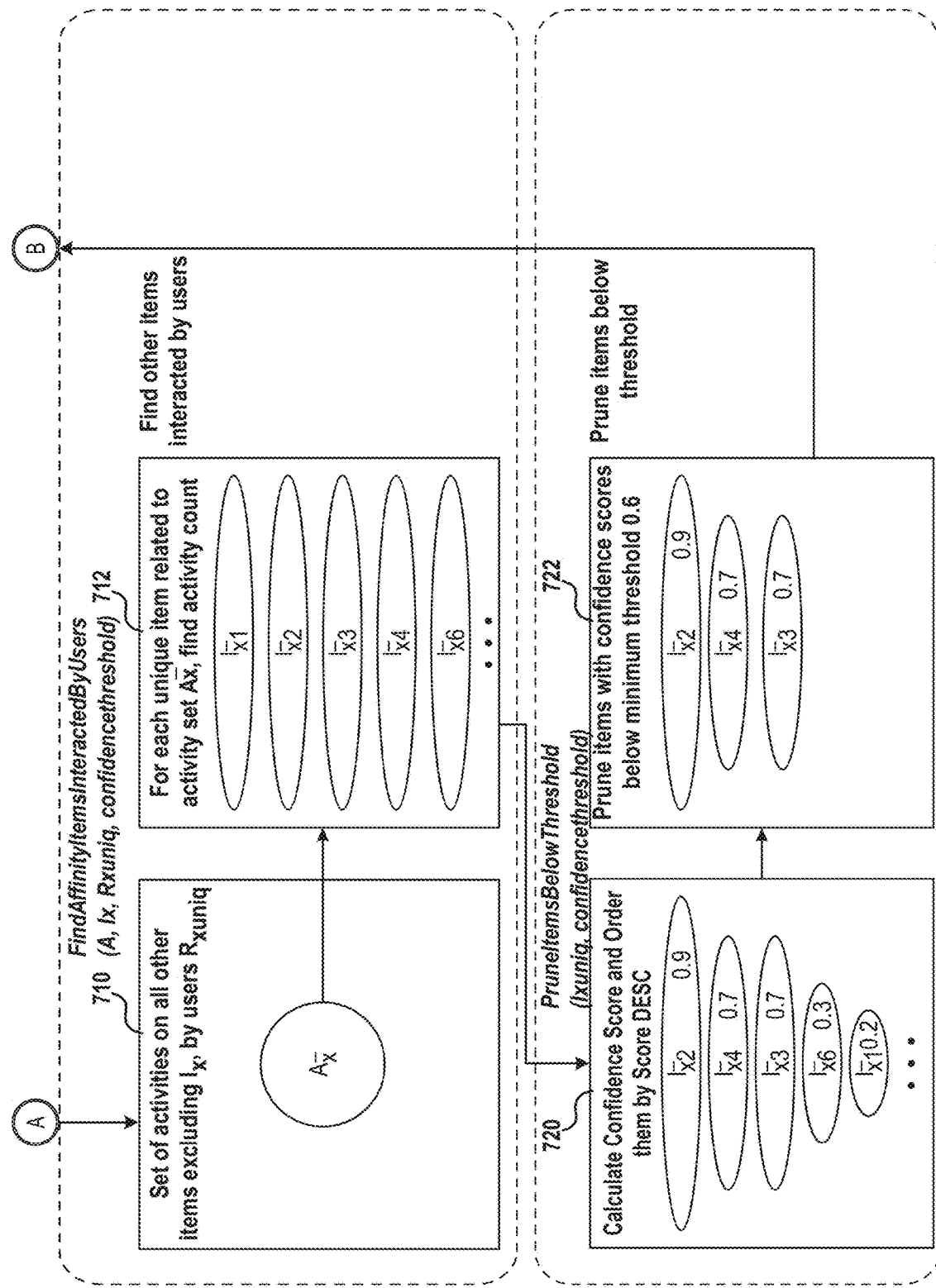

FIGS. 7A and 7B provide a diagram illustrating an example an unsupervised machine-learning method for identifying user accounts that possess (or likely possess) one or more product items of interest, in accordance with some embodiments. In particular, the unsupervised machine-learning method (as described below) identifies probable user accounts, in an online marketplace, who are likely to possess a high demand product item Ix, which represents one type of product item of interest herein. This method can calculate item-to-item affinities, using associative frequencies and a probabilistic scoring to rank relative product items, to estimate a possession of high demand product items by a user of the online marketplace associated with a user account. Additionally, the method can estimate possession of a product item that could have been obtained (e.g., purchased), from a source external to an online marketplace, by users associated with user accounts on the online marketplace, even when the online marketplace does not have access to record(s) that provide a history (e.g., purchase history) of obtaining the product item. According to some embodiments, an online marketplace runs the method described below on a recurring or semi-recurring basis to notify probable users about selling opportunities for their product items. Using such a method may enable an online marketplace to source high demand products items from its own user base.

According to some embodiments, the method comprises the following main function FindTargets (Ix, A), which can find a probable list of target user accounts for sourcing a high demand product item Ix based on a user activity A (from a user database of an online marketplace) on or with respect to an online marketplace, which may comprise one or more records identifying a user account, a product item, and a user activity associated with the user account and product item (e.g., user associated with user account listed, purchased or browsed the product item Ix). The output of the main function can comprise a set of user accounts for sourcing the produce item Ix with an associated confidence score. As shown below, FindTargets (Ix, A) calls on FindAffinityItemsInteractedByUsers (A, Ix, Rxuniq, confidencethreshold), which calls on PruneItemsBelowThreshold (Ixuniq, confidencethreshold). FindAffinityItemsInteractedByUsers (A, Ix, Rxuniq, confidencethreshold) can find an ordered set of product items excluding high demand product item Ix, with interactions greater (e.g., recorded count of activities by an input set of user accounts) than a confidence threshold (e.g., 0.6), based on the user activity A of an online marketplace, the high demand product item Ix, the set of user accounts Rxuniq associated to product item Ix, and a minimum confidence threshold (e.g., 0.6) to qualify other product items as having an affinity to product item Ix. PruneItemsBelowThreshold (Ixuniq, confidencethreshold) can normalize count of interactions into a confidence score (e.g., from 0.0 to 1.0) and remove all product items with a confidence score less than the minimum confidence threshold (e.g., 0.6) based on a set of other items Ixuniq interacted by users who interacted with products item Ix, and the confidence threshold.

As illustrated in FIG. 7A, function FindTargets (Ix, A) takes (at 704), from the user activity A, all user activity records Ax relating to the high demand of product item Ix on the online marketplace, which comprises (702) all product item listings ($A_{LX}$), user purchasing activity ($A_{PX}$), and user browsing activity ($A_{BX}$) relating to the high demand product item Ix. The function FindTargets (Ix, A) determines (at 706) one or more unique user accounts Rxuniq associated with the user activity Ax, and calls the function FindAffinityItemsInteractedByUsers (A, Ix, Rxuniq, confidencethreshold) to find an ordered set of product items excluding the high demand product item Ix, with interactions greater than a confidence threshold (e.g., 0.6). At 708, the function FindAffinityItemsInteractedByUsers (A, Ix, Rxuniq, confidencethreshold) returns target user accounts ($R_{##}$) that possess (or likely possess) the high demand product item Ix and can be a source for high demand product item Ix (e.g., can list the high demand product item Ix on the online marketplace for sale).

As illustrated in FIG. 7B, the function FindAffinityItemsInteractedByUsers (A, Ix, Rxuniq, confidencethreshold) is called by the function FindTargets (Ix, A), and (at 710) determines all user activities $A\overline{x}$, excluding those relating to the high demand product item Ix, by the unique user accounts Rxuniq, for each unique product item $\overline{Ix}_{\#}$ related to user activities $A\overline{x}$. The function FindAffinityItemsInteractedByUsers (A, Ix, Rxuniq, confidencethreshold) then (at 712) determines an activity count for each unique item for each unique product item $\overline{Ix}_{\#}$ related to user activities $A\overline{x}$ by calling the function PruneItemsBelowThreshold (Ixuniq, confidencethreshold). The function PruneItemsBelowThreshold (Ixuniq, confidencethreshold) to remove all product items with a confidence score less than the minimum confidence threshold (e.g., 0.6) based on the set of other items $\overline{Ix}$uniq interacted with by users who interacted with products item Ix. In doing so, the function PruneItemsBelowThreshold ($\overline{Ix}$uniq, confidencethreshold) can normalize activity counts into confidence scores 0.0 to 1.0, order items by their confidence scores and remove items with scores below threshold. The function PruneItemsBelowThreshold ($\overline{Ix}$uniq, confidencethreshold) (at 720) calculates confidence scores for each of the unique product item $\overline{Ix}_{\#}$, orders them in descending order, and (at 722) prunes the unique product item $\overline{Ix}_{\#}$ that having a confidence score below a minimum threshold confidencethreshold (e.g., 0.6).

FindTargets (Ix, A)

```
{
  ALx ← {a | a ∈ L (a, {Ix})};
  // where ALx is the set of all listing L for-sale activity recorded for product
  // item Ix
  APx ← {a | a ∈ P (a, { Ix })};
  // where APx is the set of all purchasing activity P recorded for product item
  // Ix
  ABx ← {a | a ∈ B (a, { Ix })};
  //where ABx is the set of all browsing/searching activity B recorded for
  // product item Ix
  Ax ← ALx U APx U Abx;
  // where Ax is the set of all listing, purchasing, and browsing activity recorded
  // for product item Ix
  // Minimum confidence threshold to qualify other product items as having an
  // affinity to product item Ix; example threshold; may differ by embodiment)
  confidencethreshold ← 0.6;
  Rxuniq ← UNIQ(Ax.User); // where Rxuniq is the unique set of all users
  whose activity exists for product item Ix;
  Iwx̄    ←    FindAffinityItemsInteractedByUsers    (A, Ix, Rxuniq,
  confidencethreshold);
    // where input Rxuniq is the set of all users who either listed,
    purchased, or browsed product item Ix;
    // where output Iwx̄ is the ordered set of other product items with
    highest affinity to same user set {Ax.User}
  targetrank ← 0; //initialize targetrank
  // Identify probable users who possess product item Ix by rank - Rt0, Rt1, Rt2,
  . . .
  // Most probable users are the ones with purchasing or browsing activities on
  product
  // item Ix
  Rt[0] = {r | r ∈ ( {APx .User} U {ABx .User} )};
  // Identify next probable users based on interactions with product items having
  affinity
  // to product item Ix
  Ip ← { }; // Processed higher confidence product items
  Rp ← { Rt[0] }; // Processed higher confidence users
  // Iterate affinity product items from highest to lowest confidence
  for all i ∈ Iwx̄ do
    Ip ← Ip U {i};
    // Set of all listing, purchasing, and browsing activities for item i.
    Ai ← {a | a ∈ LPB (a, i)};
    // Set of all users related to Ai, who are not already identified as higher
    // confidence users
    Ri ← {r | r ∈ {Ai .User} ∧ r ∉ Rp};
    // Remaining lower confidence product items.
    Ir ← { i | i ∈ Iwx̄ ∧ i ∉ Ip };
    // Initialize interacted count to total number of lower confidence
    product items
    interactedcount ← | Ir |;
    // Give higher score to users interacted with more number of lower
    //confidence
    // product items.
    while interactedcount > 0 do
      Ri[interactedcount] ← { };
      // Iterate all item subsets having size=interactedcount
      for all S ∈ [ Ir ]interactedcount do
        Rs ← { }; // User interacted with all product items in a
        subset
        for all i ∈ S do
          Atemp ← {a | a ∈ LPB (a, i)};
          Rtemp ← {r | r ∈ {Atemp.User} ∧ r ∉ Rp};
          if Rs == { } then
            Rs ← Rtemp;
          else
            Rs ← Rs ∩ Rtemp; // Eliminates unique
          users
          end if
          if Rs == { } then
            break;
          end if
        end for
```

```
        Ri[interactedcount] ← Ri[interactedcount] ∪ Rs
      end for
      if |Ri[interactedcount]| > 0 then
        targetrank ← targetrank + 1;
        Rt[targetrank] = Ri[interactedcount];
      end if
      interactedcount ← interactedcount-1;
    end while
    target ← targetrank + 1;
    Rt[targetrank] = Ri;
  end for
}
```

FindAffinityItemsInteractedByUsers (A, Ix, Rxuniq, confidencethreshold)

```
{
  Ax̄ ← {a | a ∈ LPB (a, Ix, Rxuniq)};
  // where Ax̄ is the set of all listing, purchasing, and browsing activities
  // recorded for other product items excluding item Ix, by users who are
  // associated to product item Ix.
  // Provide different weights for activity types, e.g., less weight (0.5)
  // given for browsing activity
  wL ← 1, wP ← 1, wB ← 0.5;
  Ix̄uniq ← UNIQ(Ax̄ .Item);
  // where Ix̄uniq is the unique set of other product items interacted by
  Rxuniq for each item i ∈ Ix̄uniq do
    Ai ← {a | a ∈ Ax̄ ∧ a.Item = i };
    for each itemactivities a ∈ Ai do
      Switch (a.ActivityType);
        Case 'Listing': i.affinityscore += wL
          break;
        Case 'Purchasing': i.affinityscore += wP:
          break;
        Case 'Browsing': i.affinityscore += wB:
          break;
      End Switch
    end for
  end for
  return PruneItemsBelowThreshold (Ix̄uniq, confidencethreshold);
}
```

PruneItemsBelowThreshold (Ix̄uniq, confidencethreshold)

```
{
  sumaffinityscores = ∑_{i∈Ix̄uniq} (i.affinityscore);

for each item i ∈ Ix̄uniq do
    i.confidence = i.affinityscore/sumaffinityscores;
  end for
  Iwx̄ ← (Ix̄, confidence) ← {i | i ∈ Ix̄uniq ∧ i. confidence ≥
  confidencethreshold};
      // where Iwx̄ is a weighted multiset of product items excluding
      //product item Ix, which carries confidence score greater than
      // or equal to confidencethreshold, by users who have
      // known association to product item Ix, ordered in descending
      // order of their interaction score used for inferring the affinity
      levels.
  return Iwx̄;
}
```

Figure 8:
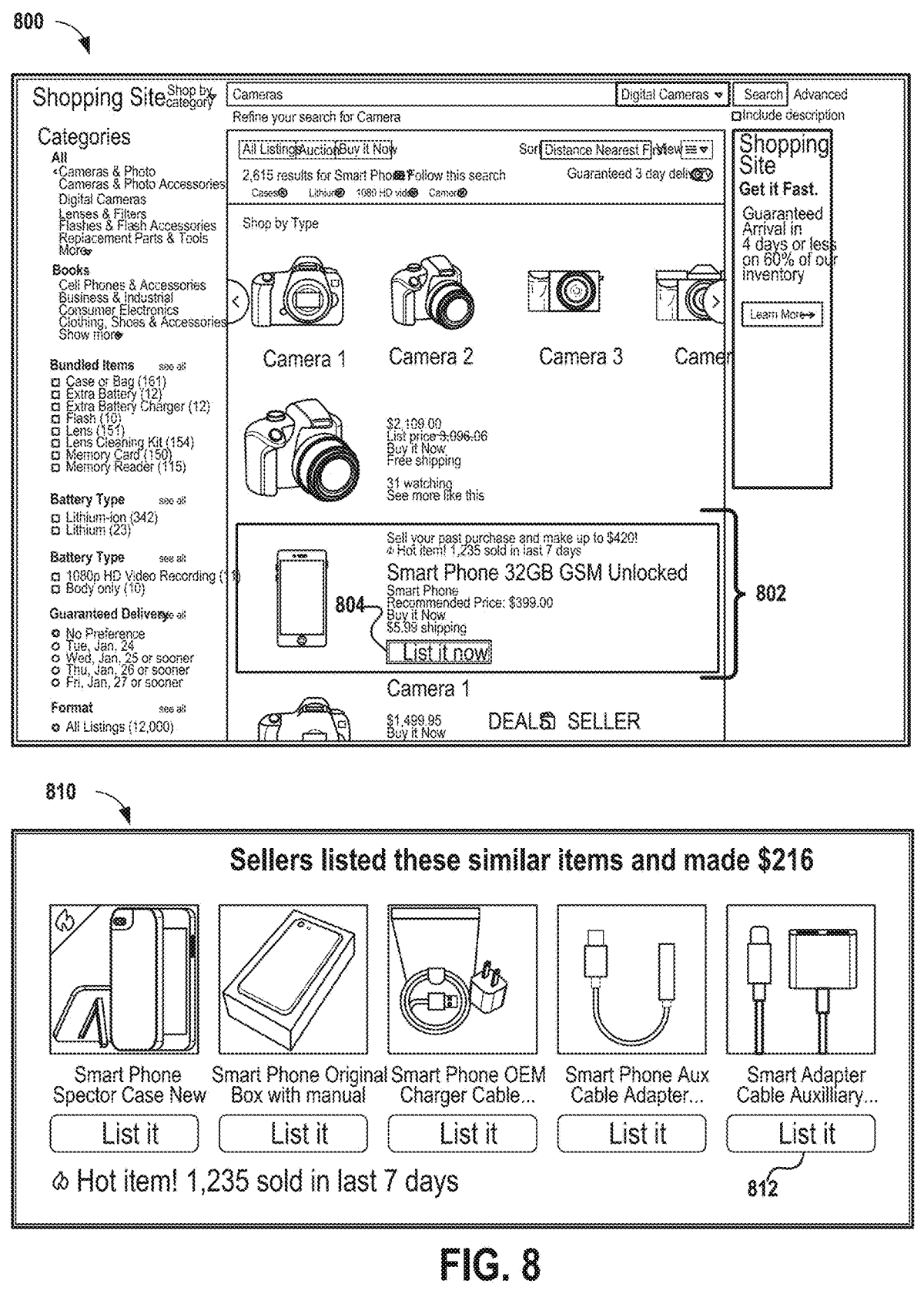

FIG. 8 illustrates example notifications, in accordance with some embodiments. In particular, with respect to a search result web page 800 on an online marketplace, an embodiment may cause a notification 802 for a selling opportunity of a product of interest (e.g., selling the product item "Smart Phone 32 GB GSM Unblocked") to be embedded in the web page 800, where the notification 802 includes a button 804 that, when selected by a user (e.g., at a client machine 108 or 112), initiates a process by which the user can list the product item of interest for sale on the online marketplace. An alternative notification 810 presents a user with multiple products of interest, each of which may have been identified as described herein. As shown, the alternative notification 810 includes buttons 812, corresponding to the products of interest, for listing the respective products of interest for sale on the online marketplace. The alternative notification 810 may be displayed, for example, as part of a web page of the online marketplace or a graphical user interface of a client application (e.g., mobile device application).

Figure 9:
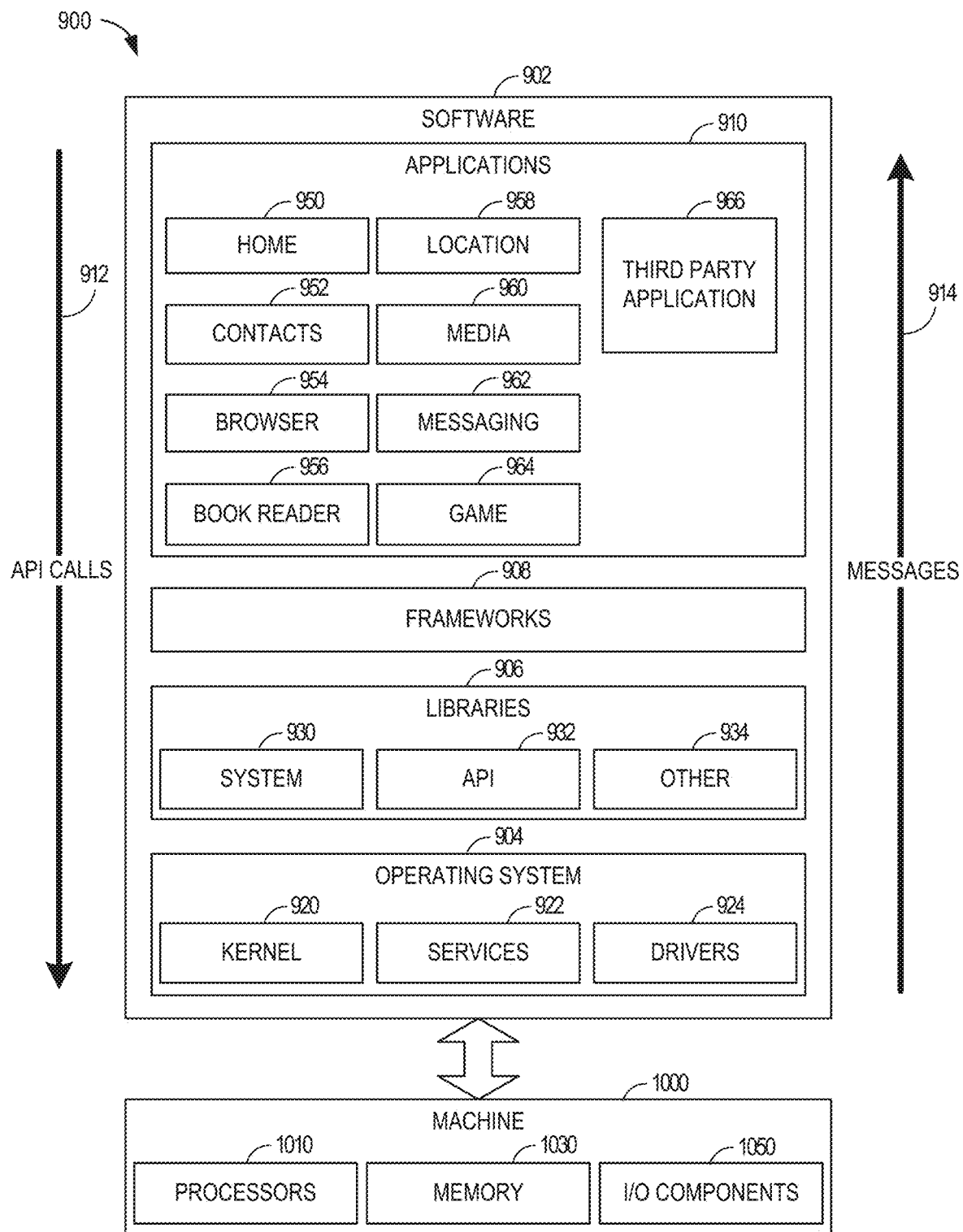
FIG. 9 is a block diagram illustrating an architecture of software, which can be installed on any one or more of the devices described above.

FIG. 9 is a block diagram 900 illustrating an architecture of software 902, which can be installed on any one or more of the devices described above. FIG. 9 is merely a non-limiting example of a software architecture, and it will be appreciated that many other architectures can be implemented to facilitate the functionality described herein. In various embodiments, the software 902 is implemented by hardware such as a machine 1000 of FIG. 10 that includes processors 1010, memory 1030, and input/output (I/O) components 1050. In this example architecture, the software 902 can be conceptualized as a stack of layers where each layer may provide a particular functionality. For example, the software 902 includes layers such as an operating system 904, libraries 906, frameworks 908, and applications 910. Operationally, the applications 910 invoke API calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (eg., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphical user interface functions, high-level resource management, high-level location services, and so forth. The frameworks 908 can provide a broad spectrum of other APIs that can be utilized by the applications 910, some of which may be specific to a particular operating system or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third-party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third-party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 966 can invoke the API calls 912 provided by the operating system 904 to facilitate functionality described herein.

Figure 10:
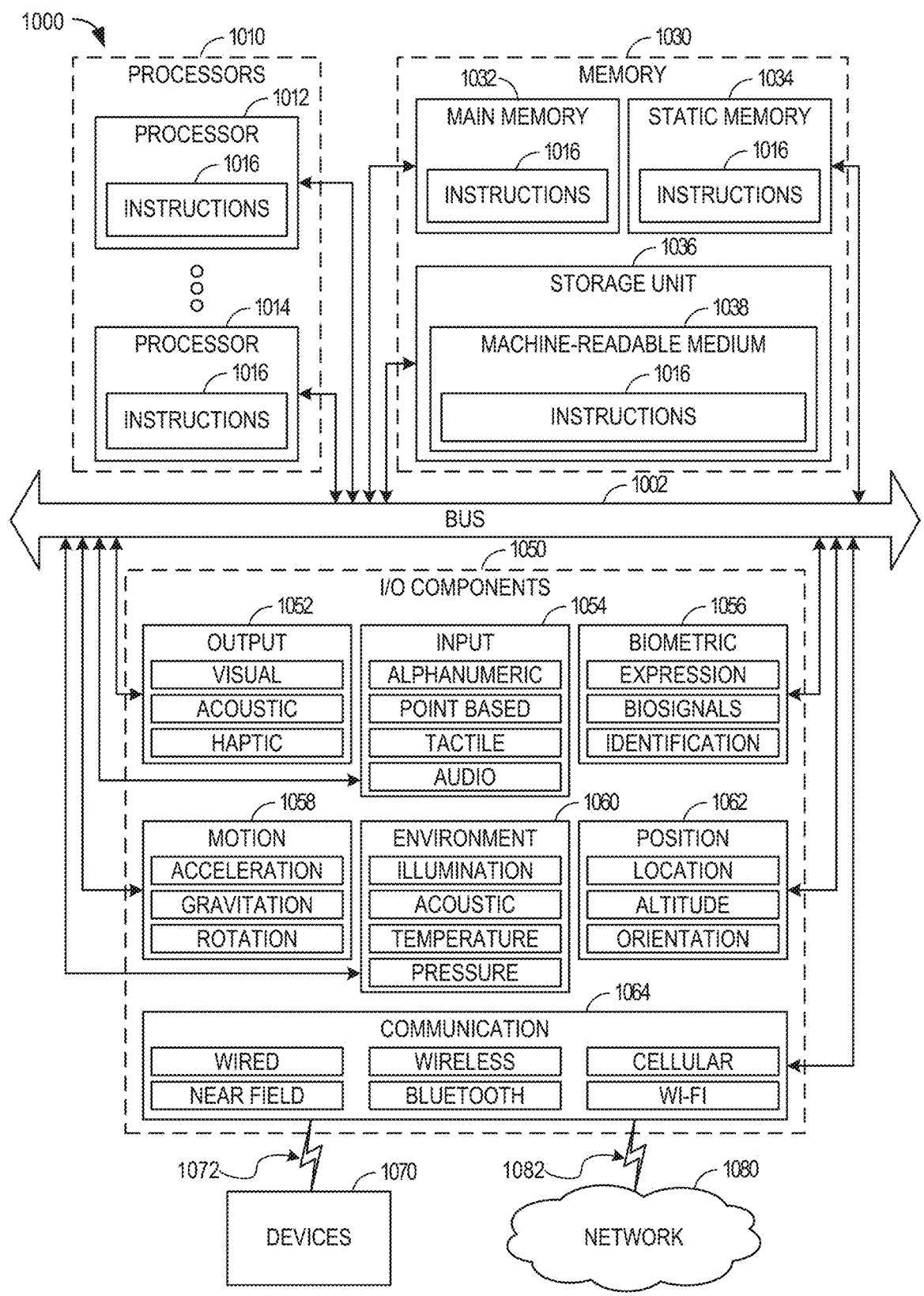
FIG. 10 illustrates a diagrammatic representation of a machine in the form of a computer system within which a set of instructions may be executed for causing the machine to perform any one or more of the methodologies discussed herein, according to an example embodiment.

FIG. 10 illustrates a diagrammatic representation of a machine 1000 in the form of a computer system within which a set of instructions may be executed for causing the machine to perform any one or more of the methodologies discussed herein, according to an example embodiment. Specifically, FIG. 10 shows a diagrammatic representation of the machine 1000 in the example form of a computer system, within which instructions 1016 (e.g., software, a program, an application, an applet, an app, or other executable code, such as the product item identification application(s) 150) for causing the machine 1000 to perform any one or more of the methodologies discussed herein may be executed. For example, the instructions 1016 may cause the machine 1000 to execute the method 300 of FIG. 3. The instructions 1016 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an application-specific integrated circuit (ASIC), a Radio-Frequency Integrated Circuit (RFIC), another processor, or any suitable combination thereof) may include, for example, a processor 1012 and a processor 1014 that may execute the instructions 1016. The term "processor" is intended to include multi-core processors that may comprise two or more independent processors (sometimes referred to as "cores") that may execute instructions contemporaneously. Although FIG. 10 shows multiple processors 1010, the machine 1000 may include a single processor with a single core, a single processor with multiple cores (e.g., a multi-core processor), multiple processors with a single core, multiple processors with multiples cores, or any combination thereof.

The memory 1030 may include a main memory 1032, a static memory 1034, and a storage unit 1036 including a machine-readable medium 1038, each accessible to the processors 1010 such as via the bus 1002. The main memory 1032, the static memory 1034, and the storage unit 1036 store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion, and the grouping is in no way limiting. In various example embodiments, the I/O components 1050 may include output components 1052 and input components 1054. The output components 1052 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1062 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a USB).

Moreover, the communication components 1064 may detect identifiers or include components operable to detect identifiers. For example, the communication components 1064 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

The various memories (i.e., 1030, 1032, 1034, and/or memory of the processor(s) 1010) and/or the storage unit 1036 may store one or more sets of instructions and data structures (e.g., software) embodying or utilized by any one or more of the methodologies or functions described herein. These instructions (e.g., the instructions 1016), when executed by the processor(s) 1010, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1080 may be an ad hoc network, an intranet, an extranet, a virtual private network (VPN), a local-area network (LAN), a wireless LAN (WLAN), a WAN, a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., HTTP). Similarly, the instructions 1016 may be transmitted or received using a transmission medium via the coupling 1072 (e.g., a peer-to-peer coupling) to the devices 1070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1016 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

Throughout this specification, plural instances may implement resources, components, operations, or structures described as a single instance. Although individual operations of one or more methods are illustrated and described as separate operations, one or more of the human individual operations may be performed concurrently, and nothing requires that the operations be performed in the order illustrated.

As used herein, modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various embodiments, one or more computer systems or one or more hardware modules thereof may be configured by software (e.g., an application or portion thereof) as a hardware module that operates to perform operations described herein for that module.

In some embodiments, a hardware module may be implemented electronically. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over suitable circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

As used herein, the term "or" may be construed in either an inclusive or exclusive sense. The terms "a" or "an" should be read as meaning "at least one," "one or more" or the like. The presence of broadening words and phrases such as "one or more," "at least," "but not limited to," or other like phrases in some instances shall not be read to mean that the narrower case is intended or required in instances where such broadening phrases may be absent. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate components in example configurations may be implemented as a combined structure or component. Similarly, structures and functionality presented as a single component may be implemented as separate components. The specification and drawings are, accordingly, to be regarded in an illustrative rather than a restrictive sense.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

It will be understood that changes and modifications may be made to the disclosed embodiments without departing from the scope of the present disclosure. These and other changes or modifications are intended to be included within the scope of the present disclosure.

What is claimed is:

1. A method comprising:
   identifying, by one or more processors, in a product item database, a first product item record for a first product item of interest that is in high demand on an online marketplace system;
   determining, by the one or more processors from a user database, a first set of user accounts associated with obtaining the first product item of interest through the online marketplace system;
   determining, by the one or more processors from the user database, a second set of user accounts associated with listing the first product item of interest for sale on the online marketplace system;
   determining, by the one or more processors, at least one product item affinity pattern between the first set of user accounts and the second set of user accounts, the at least one product item affinity pattern being determined based on a first set of product items bought by the first set of user accounts through the online marketplace system and a second set of product items listed by the second set of user accounts on the online marketplace system;
   determining, by the one or more processors, a third set of user accounts based on the first set of user accounts, the second set of user accounts, and the at least one product item affinity pattern; and
   causing, by the one or more processors, a notification to be sent to one or more client devices associated with the third set of user accounts, the notification informing the third set of user accounts of an opportunity to list the first product item of interest for sale on the online marketplace system.

2. The method of claim 1, wherein the first product item of interest is identified as being in high-demand based on a surge in sales of the first product item product through the online marketplace system, the surge being identified by a machine learning model.

3. The method of claim 1, wherein the first product item of interest is identified as being in high-demand based on a surge in listing of the first product item of product item for sale on the online marketplace system, the surge being identified by a machine learning model.

4. The method of claim 1, wherein the determining the at least one product item affinity pattern between the first set of user accounts and the second set of user accounts comprises:
   determining, from the product item database, a first set of product item records for the first set of product items bought by the first set of user accounts through the online marketplace system;
   determining, from the product item database, a second set of product item records for the second set of product items listed by the second set of user accounts on the online marketplace system;
   determining a third set of product items common to both the first set of product items and the second set of product items;
   determining a second product item of interest in the third set of product items; and
   determining the third set of user accounts, from the user database, the third set of user accounts being associated with listing the second product item of interest on the online marketplace system.

5. The method of claim 4, wherein the first set of product items excludes the first product item of interest, and the second set of product items excludes the first product item of interest.

6. The method of claim 4, wherein the determining the at least one product item affinity pattern between the first set of user accounts and the second set of user accounts further comprises:
   determining a first ranking for the first set of product items; and
   determining a second ranking for the second set of product items, the determining the second product item of interest in the third set of product items comprising:
      determining the second product item of interest in the third set of product items based on the first ranking and the second ranking.

7. The method of claim 6, wherein the determining the second product of interest in the third set of product items based on the first ranking and the second ranking comprises:
   determining, in the third set of product items, a particular product item having a highest ranking based on the first ranking and the second ranking.

8. The method of claim 1, further comprising:
causing, by the one or more processors, the notification to be sent to the first set of user accounts.

9. The method of claim 1, further comprising:
determining, by the one or more processors from the user database, a subset of user accounts of the second set of user accounts, the subset of user accounts not being associated with a current listing of the first product item of interest for sale on the online marketplace system; and
causing, by the one or more processors, the notification to be sent to the subset of user accounts.

10. The method of claim 1, further comprising:
determining, by the one or more processors from the user database, a fourth set of user accounts associated with a current listing of the first product item of interest for sale on the online marketplace system;
applying, by the one or more processors, a machine learning model to the fourth set of user accounts to determine a set of user segments each associated with a different set of factors, the different set of factors including at least one of a demographic attribute, a geographic location, or a psychographic attribute;
determining, by the one or more processors from the user database, a subset of user accounts of the second set of user accounts based on at least one user segment from the set of user segments, the set of user accounts being associated with the at least one user segment and not being associated with a current listing of the first product item of interest for sale on the online marketplace system; and
causing, by the one or more processors, the notification to be sent to the subset of user accounts.

11. A system comprising:
one or more processors; and
a computer-readable medium having instructions stored there on, which, when executed by the one or more processors, cause the system to perform operations comprising:
identifying, from a product item database, a first product item record for a first product item of interest that is in high demand on an online marketplace system;
determining, from a user database, a first set of user accounts associated with obtaining the first product item of interest through the online marketplace system;
determining, from the user database, a second set of user accounts associated with listing the first product item of interest for sale on the online marketplace system;
determining at least one product item affinity pattern between the first set of user accounts and the second set of user accounts, the at least one product item affinity pattern being determined based on a first set of product items bought by the first set of user accounts through the online marketplace system and a second set of product items listed by the second set of user accounts on the online marketplace system;
determining a third set of user accounts based on the first set of user accounts, the second set of user accounts, and the at least one product item affinity pattern; and
causing a notification to be sent to one or more client devices associated with the third set of user accounts, the notification informing the third set of user accounts of an opportunity to list the first product item of interest for sale on the online marketplace system.

12. The system of claim 11, wherein the first product item of interest is identified as being in high-demand based on a surge in sales of the first product item product through the online marketplace system, the surge being identified by a machine learning model.

13. The system of claim 11, wherein the first product item of interest is identified as being in high-demand based on a surge in listing of the first product item of product item for sale on the online marketplace system, the surge being identified by a machine learning model.

14. The system of claim 11, wherein the determining the at least one product item affinity pattern between the first set of user accounts and the second set of user accounts comprises:
determining, from the product item database, a first set of product item records for the first set of product items bought by the first set of user accounts through the online marketplace system;
determining, from the product item database, a second set of product item records for the second set of product items listed by the second set of user accounts on the online marketplace system;
determining a third set of product items common to both the first set of product items and the second set of product items;
determining a second product item of interest in the third set of product items; and
determining the third set of user accounts, from the user database, the third set of user accounts being associated with listing the second product item of interest on the online marketplace system.

15. The system of claim 14, wherein the first set of product items excludes the first product item of interest, and the second set of product items excludes the first product item of interest.

16. The system of claim 14, wherein the determining the at least one product item affinity pattern between the first set of user accounts and the second set of user accounts further comprises:
determining a first ranking for the first set of product items; and
determining a second ranking for the second set of product items, the determining the second product item of interest in the third set of product items comprising:
determining the second product item of interest in the third set of product items based on the first ranking and the second ranking.

17. The system of claim 16, wherein the determining the second product of interest in the third set of product items based on the first ranking and the second ranking comprises:
determining, in the third set of product items, a particular product item having a highest ranking based on the first ranking and the second ranking.

18. The system of claim 11, the operations further comprising:
determining, from the user database, a subset of user accounts of the second set of user accounts, the subset of user accounts not being associated with a current listing of the first product item of interest for sale on the online marketplace system; and
causing the notification to be sent to the subset of user accounts.

19. The system of claim 11, the operations further comprising:

determining, from the user database, a fourth set of user accounts associated with a current listing of the first product item of interest for sale on the online marketplace system;

applying a machine learning model to the fourth set of user accounts to determine a set of user segments each associated with a different set of factors, the different set of factors including at least one of a demographic attribute, a geographic location, or a psychographic attribute;

determining, from the user database, a subset of user accounts of the second set of user accounts based on at least one user segment from the set of user segments, the set of user accounts being associated with the at least one user segment and not being associated with a current listing of the first product item of interest for sale on the online marketplace system; and causing the notification to be sent to the subset of user accounts.

20. A non-transitory computer-readable storage medium comprising instructions that, when executed by at least one processor of a machine, cause the machine to perform operations comprising:

identifying, from a product item database, a first product item record for a first product item of interest that is in high demand on an online marketplace system;

determining, from a user database, a first set of user accounts associated with obtaining the first product item of interest through the online marketplace system;

determining, from the user database, a second set of user accounts associated with listing the first product item of interest for sale on the online marketplace system;

determining at least one product item affinity pattern between the first set of user accounts and the second set of user accounts, the at least one product item affinity pattern being determined based on a first set of product items bought by the first set of user accounts through the online marketplace system and a second set of product items listed by the second set of user accounts on the online marketplace system;

determining a third set of user accounts based on the first set of user accounts, the second set of user accounts, and the at least one product item affinity pattern; and causing a notification to be sent to one or more client devices associated with the third set of user accounts, the notification informing the third set of user accounts of an opportunity to list the first product item of interest for sale on the online marketplace system.

* * * * *